United States Patent [19]
Di Grasso

[11] 3,946,928
[45] Mar. 30, 1976

[54] ADJUSTABLE DIE FOR COLDWELDING MACHINE

[75] Inventor: Leonard Di Grasso, Philadelphia, Pa.

[73] Assignee: Kelsey-Hayes Company, Romulus, Mich.

[22] Filed: Jan. 2, 1973

[21] Appl. No.: 320,097

[52] U.S. Cl. ................................... 228/3.1; 228/4.1
[51] Int. Cl.² .................................... B23K 21/00
[58] Field of Search ............... 228/3, 4, 3.1, 4.1; 29/470.1; 140/113; 269/160; 249/95

[56] References Cited
UNITED STATES PATENTS

| | | | |
|---|---|---|---|
| 106,380 | 8/1870 | Marshall | 269/160 |
| 2,891,430 | 6/1959 | Johnson | 228/3 |
| 2,927,487 | 3/1960 | Barnes | 228/3 |
| 3,044,328 | 7/1962 | Zysk | 228/3 |
| 3,093,018 | 6/1963 | Rozmus | 228/3 |
| 3,336,655 | 8/1967 | Rozmus | 29/470.1 |
| 3,768,718 | 10/1973 | Rozmus | 140/113 X |

*Primary Examiner*—J. Howard Flint, Jr.
*Assistant Examiner*—Gus T. Hampilos
*Attorney, Agent, or Firm*—Harness, Dickey & Pierce

[57] ABSTRACT

An adjustable die set for a coldwelding machine that is adjustable to facilitate its use with workpieces of varying dimensions. Specifically the die set includes pairs of dies having a screw threaded adjustable stop interconnecting them for adjusting the spacing between the dies.

1 Claim, 3 Drawing Figures

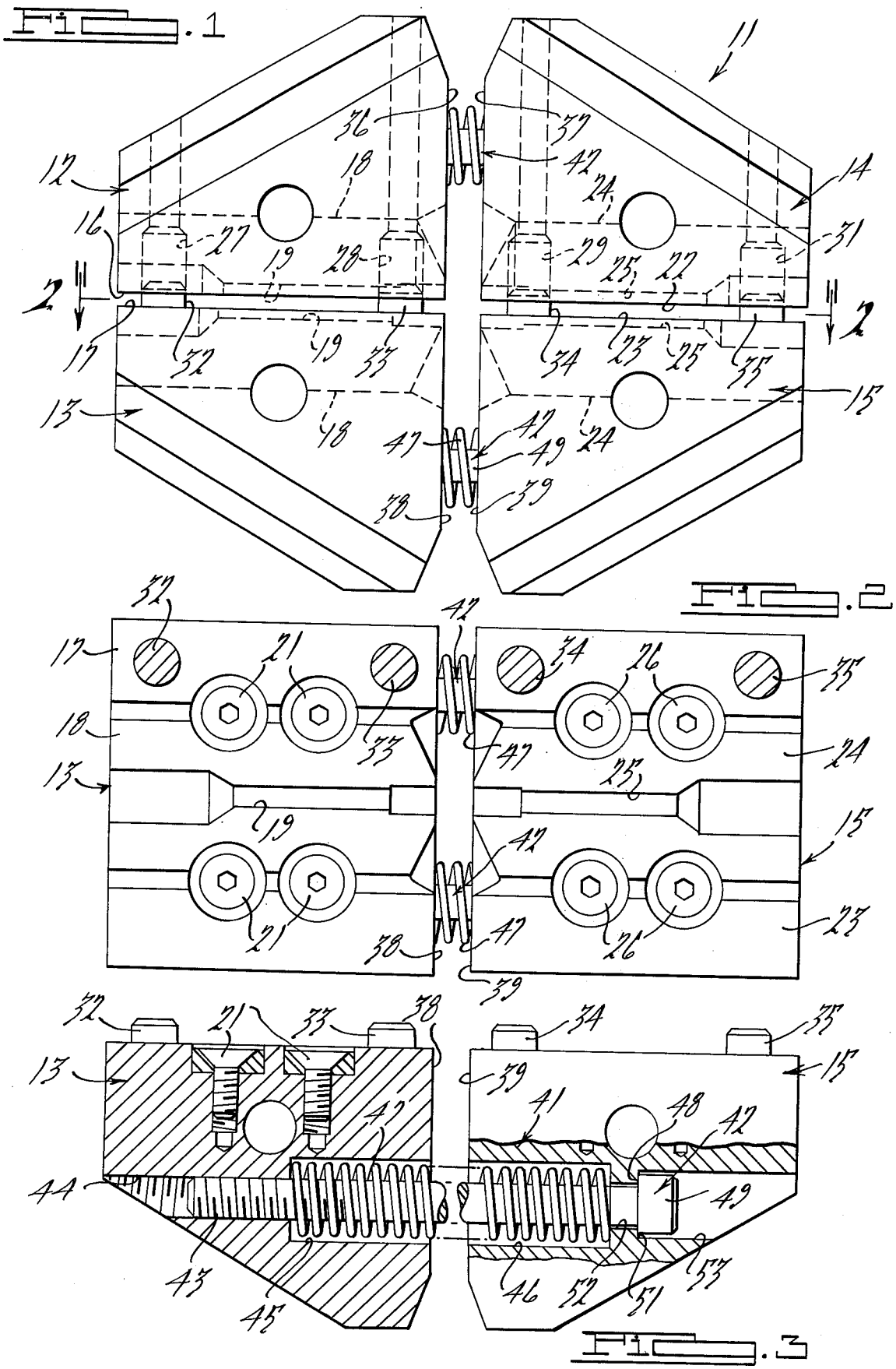

ADJUSTABLE DIE FOR COLDWELDING MACHINE

BACKGROUND OF THE INVENTION

This invention relates to a die set for a coldwelding machine and more particularly to an improved, adjustable die set.

The normal coldwelding machine employed for welding pieces of wire or the like embodies two pairs of dies. Each pair of dies is movable between an opened position in which the workpiece may slide between the dies of the pairs and a closed position in which workpieces are gripped by the dies. When the workpieces are gripped by the pairs of dies, the pairs are moved toward each other from a spaced position to a welding position to effect an upset. The spacing between the dies of the pairs and between the pairs of dies in their opened positions is relatively critical. For example, it is normal practice to move the ends of the workpieces toward each other a distance approximately equal to twice the diameter of the wire being welded during each upset. Frequently a given set of dies is used for welding a range of wire diameters. Thus, when the diameter of the wire being welded is changed it is necessary to adjust the spacing between the pairs of dies. This has, heretofore, been accomplished by the use of removable spacers. Such an arrangement has obvious disadvantages. Considerable time is involved with making adjustments, additional parts are required and the possibility of error is introduced.

It is, therefore, a principal object of this invention to provide a die set for a coldwelding machine in which the spacing between the dies may be conveniently adjusted.

It is another object of the invention to provide an adjustable die set for a coldwelding machine.

It is a further object of the invention to provide an improved, adjustable die set for a coldwelding machine.

SUMMARY OF THE INVENTION

This invention is adapted to be embodied in a die set for a coldwelding machine that includes first and second dies. The dies have facing surfaces and are adapted to be used in a machine having means for moving the surfaces relative to each other. Adjustable stop means are interconnected to the dies and permit the dies to move relative to each other freely in a first direction and for adjustably limiting the degree of relative movement of the dies in the opposite direction.

BRIEF DESCRIPTION OF THE DRAWINGS

FIG. 1 is a top plan view of an adjustable die set for a coldwelding machine embodying this invention.

FIG. 2 is a cross sectional view of the die set taken in the direction of the line 2—2 in FIG. 1.

FIG. 3 is a top view of one die of each of the pairs shown in FIG. 1 with portions broken away to show the adjustment between the dies.

DETAILED DESCRIPTION OF THE PREFERRED EMBODIMENT

A die set for a coldwelding machine, which die set embodies this invention, is identified generally by the reference numeral 11. The die set 11 is comprised of a first pair of dies 12 and 13 and a second pair of dies 14 and 15. The dies 12, 13 and 14, 15 of the pairs are adapted to be moved toward and away from each other and the pairs of dies 12 and 13 and 14 and 15 are adapted to be moved toward and away from each other in a coldwelding sequence by a suitable coldwelding machine (not shown). The coldwelding machine may be of any of the known types embodying such dies. Examples of suitable machines may be used in conjunction with dies of the type disclosed herein are shown in U.S. Pat. Nos. 2,863,344 issued Dec. 9, 1958 in the name of William A. Barnes; 2,909,086 issued Oct. 20, 1959 in the name of William A. Barnes et al.; 2,909,951 issued Oct. 27, 1959 in the name of Walter J. Rozmus et al.; 2,932,221 issued Apr. 12, 1960 in the name of William A. Barnes et al.; 3,044,328 issued July 17, 1962 in the name of Stanley A. Zysk; 3,606,131 issued Sept. 20, 1971 in the name of Walter J. Rozmus or any of the other known machines of this type.

The dies 12 and 13 have facing surfaces 16 and 17 in which recesses are formed. In each recess is received a hardened insert 18 which insert is formed with a cavity 19 that is adapted to grippingly engage a wire, in a manner which will become more apparent as this description proceeds. The inserts 18 are held in each of the dies 12 and 13 by machine screws 21 or the like.

In a like manner, the dies 14 and 15 have facing surfaces 22 and 23 that are recessed to receive respective hardened inserts 24 in which cavities 25 are formed to receive the wire to be welded. The inserts 24 are held in place by machine screws 26.

The dies 12 and 14 are each formed with respective pairs of counterbored openings 27, 28 and 29, 31. Affixed to the dies 13 and 15 and extending from their respective faces 17 and 23 are pairs of pins 32, 33 and 34, 35. The pins 32 and 33 cooperate with the counterbores 27 and 28 to locate the dies 12 and 13 axially relative to each other while permitting free movement of the faces 16 and 17 toward and away from each other. In a similar manner, the pins 34 and 35 cooperate with the counterbored openings 29, 31 to locate the dies 14 and 15 axially relative to each other and to permit the faces 22 and 23 to move toward and away from each other.

An adjusting mechanism is provided between the dies 12, 14 and 13, 15 for holding respective facing surfaces 36, 37 and 38, 39 of these dies at an adjustably affixed distance. The adjusting mechanism, however, permits the faces 36, 37 and 38, 39 to move freely toward each other into abutting engagement. This adjusting mechanism may be best understood by reference to FIG. 3 wherein the mechanism associated with the dies 13 and 15 is illustrated in detail and is identified generally by the reference numeral 41.

The adjusting mechanism 41 comprises a pair of vertically spaced screws 42 each of which has a threaded terminal portion 43 that is received in a respective tapped opening 44 in the die 13. The portion of the die adjacent the face 38 is formed with a counterbore 45 that is concentric with the tapped opening 44. The die 15 is also formed with a complementary counterbore 46 that extends inwardly from its face 39 and which is aligned with the counterbore 45 of the die 13. A coil compression spring 47 encircles each of the screws 42 and is received within the respective counterbores 45 and 46 to urge the dies 13 and 15 away from each other. The springs 47 urge the dies to an opened position and this position is determined by a shoulder 48 formed at the base of the head 49 of each screws 42 with a corresponding shoulder 51 formed between a pair of bored openings 52 and 53 of of the die 15. The opening 52 extends between the counterbore 46 and the opening 53, with the latter opening receiving the head 49 of the screw 42.

Each screw head 49 is accessible through the outer face of the respective die 15 so as to permit its rotation by means of an allen wrench or similar tool. This rotation causes the screw threads 43 to advance or retract in the tapped openings 44 and adjust the open distance between the die faces 38 and 39. The adjusting mechanism 41, however, permits the dies 13 and 15 to move freely toward each other so that the die faces 38 and 39 can be brought into full engagement.

It is to be understood that the foregoing description is that of a preferred embodiment of the invention. Various changes and modifications may be made without departing from the spirit and scope of the invention as defined by the appended claims.

I claim:

1. A die set for a coldwelding machine or the like comprising a first die, a second die, said dies having facing surfaces and adapted to be used in a machine having means for moving said facing surfaces relative to each other, said first die having a threaded opening extending perpendicularly to its facing surface and terminating in a counterbore extending through said facing surfaces, said second die having a bore aligned with the counterbore of said first die, a smaller diameter bore formed at the termination of said first mentioned bore and a third bore formed at the termination of said second bore and extending through an opposite face of said second die, said second and said third bores of said second die defining a shoulder facing opposite to the facing surface of said second die, and adjustable stop means interconnected to said dies for permitting said dies to move relative to each other freely in a first direction and for adjustably limiting the degree of relative movement of said dies in the opposite direction, said adjustable stop means comprising a screw extending through the bores of said second die, the counterbore of said first die and having a threaded portion received in the threaded opening of said first die, said screw having a headed portion received in said third bore of said second die and engaging said shoulder, and a coil spring means contained within said counterbore and said first bore of said second die and urging said facing surfaces of said dies away from each other and said shoulder of said second die into engagement with said head of said screw.

* * * * *